W. A. PERRY.
SHAFT COUPLING.
APPLICATION FILED JULY 28, 1908.
907,523.
Patented Dec. 22, 1908.
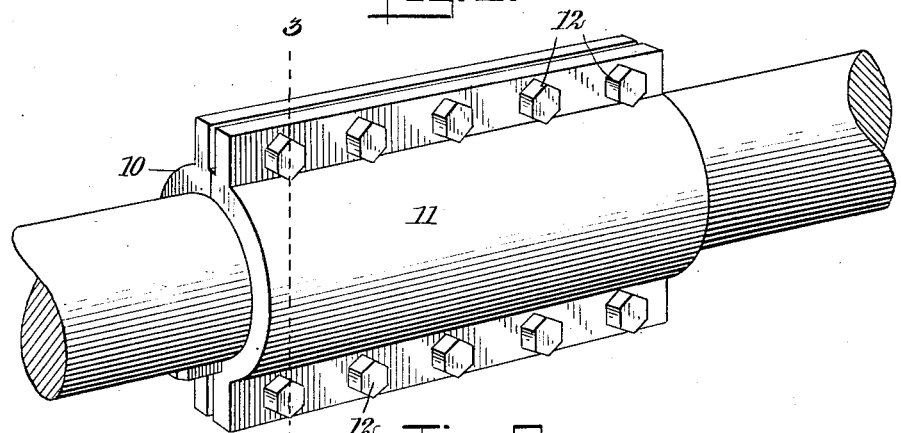
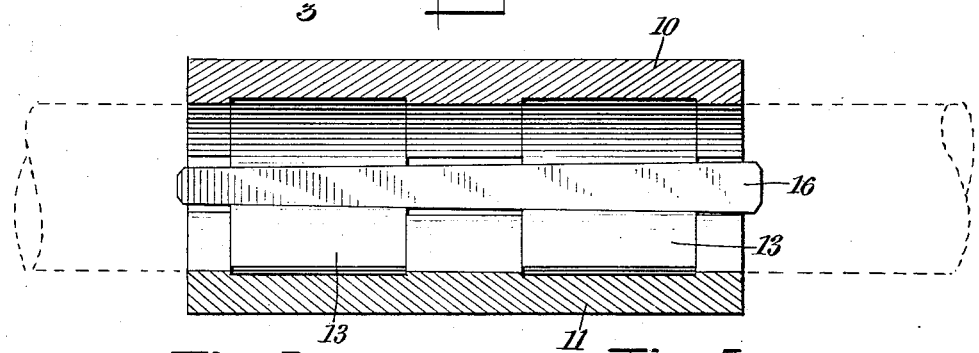
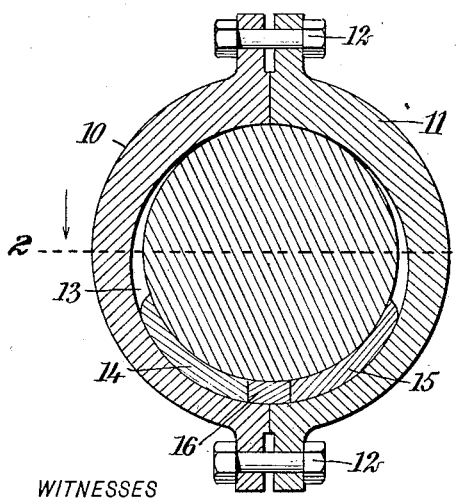
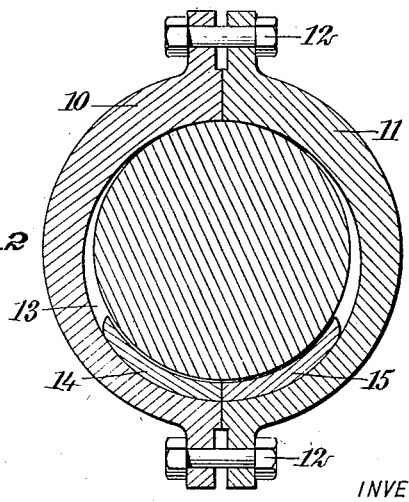
WITNESSES
INVENTOR
William Allan Perry
BY
ATTORNEYS

UNITED STATES PATENT OFFICE.

WILLIAM ALLAN PERRY, OF NEW YORK, N. Y.

SHAFT-COUPLING.

No. 907,523.      Specification of Letters Patent.      Patented Dec. 22, 1908.

Application filed July 28, 1908. Serial No. 445,757.

*To all whom it may concern:*

Be it known that I, WILLIAM ALLAN PERRY, a citizen of the United States, and a resident of the city of New York, (Astoria, Long Island City, borough of Queens,) in the county of Queens and State of New York, have invented a new and Improved Shaft-Coupling, of which the following is a full, clear, and exact description.

This invention relates to certain improvements in shaft couplings, and more particularly to that type of coupling which includes a casing surrounding the adjacent ends of the shafts to be coupled, and including a wedge forced into position by the action of a key.

The object of my invention is to provide a coupling which will operate with the same efficiency irrespective of the direction of rotation of the shaft; which is easily applied, and which cannot possibly work loose.

My invention consists in the provision of a cylindrical chamber within the casing of the coupling and tangential with the bore of the coupling, together with two separate wedges which may be simultaneously forced toward the point of tangency by the longitudinal movement of a tapered key.

Reference is to be had to the accompanying drawings, forming a part of this specification, in which similar characters of reference indicate corresponding parts in all the figures, and in which—

Figure 1 is a perspective view of a shaft coupling constructed in accordance with my invention; Fig. 2 is a longitudinal section through the coupling, taken on the line 2—2 of Fig. 3, the shafts being removed; Fig. 3 is a transverse section on the line 3—3 of Fig. 1, and illustrating the parts in operative position; and Fig. 4 is a section similar to Fig. 3, but showing the key removed and the wedges in inoperative position.

In the specific form of coupling illustrated in the accompanying drawings, there is provided a casing or sleeve, preferably formed of two separate semi-cylindrical sections or faces 10 and 11, which may be readily secured together in any suitable manner, as, for instance, by bolts 12 extending through flanges adjacent the meeting edges of the sections. Extending through the casing is a bore or passage of substantially the same diameter as the shaft in connection with which the coupling is to be used, although if this bore be of very slightly greater diameter than the shaft, the device will operate substantially as efficiently. The bore at the ends of the coupling and also adjacent the center of the coupling is concentric with the outer surface of the casing, and all three portions of the bore are in alinement.

Intermediate the center of the coupling and at each end thereof, I provide two chambers 13, each of which is circular in cross section and of slightly greater diameter than the bore and slightly concentric in respect thereto. The surface of each chamber and the surface of the bore along one side of the coupling, are in alinement. In other words, the cylindrical chambers and the bore are tangential. Within each of these chambers, I provide two wedges 14 and 15, each having an outer surface curved to fit the inner surface of the chamber, and having an inner surface curved to substantially fit the outer surface of the shaft. The wedges have a maximum thickness slightly less than the eccentricity of the chambers in respect to the bore, so that the two wedges with their bases together, as indicated in Fig. 4, do not project into the bore of the coupling, nor contact with a shaft extending through said bore.

To spread the wedges apart and force them toward the line of tangency, I provide a key 16 extending through a keyway cut in the bore along a line diametrically opposite to the line of tangency. The key is of greater width at one end than at the other, so that by driving the key into the position indicated in Figs. 2 and 3, the wedges are spread apart and their points or thinner ends forced into firm contact with the surface of the shaft and the surface of the chamber. The wedges contact with the shaft at points approximately one hundred and twenty degrees apart, and at points substantially one hundred and twenty degrees from the line of tangency. Thus, the shaft is gripped at three points substantially equi-distant apart, and any tendency of the shaft to rotate in respect to the casing, or of the casing to rotate in respect to the shaft, will cause one of the wedges to be driven still further into the tapered space leading from the keyway to the line of tangency. The greater the strain upon the shaft, the tighter will the wedges grip said shaft, and the direction of rotation does not affect the tightness of the gripping action, as one wedge will tighten when rotating in one direction and the other wedge will tighten when rotating in the opposite direction.

Having thus described my invention, I claim as new and desire to secure by Letters Patent:

The combination with a shaft, of a casing or sleeve provided with a cylindrical bore through which said shaft extends, and a cylindrical chamber within said sleeve of greater diameter than said bore and tangential thereof, two curved wedges within said chamber and each having its inner surface curved to fit the surface of the shaft and having its outer surface curved to fit the inner surface of the cylindrical chamber, and a tapered key intermediate said wedges at their thicker portions and diametrically opposite to the line of tangency, said key being movable longitudinally of the sleeve to spread the curved wedges apart toward the line of tangency and grip said shaft at the line of tangency and adjacent the ends of the wedges, said line of tangency and the gripping points of said wedges being at substantially equal distances apart and in the same transverse plane.

In testimony whereof I have signed my name to this specification in the presence of two subscribing witnesses.

WILLIAM ALLAN PERRY.

Witnesses:
CLAIR W. FAIRBANK,
JOHN P. DAVIS.